Jan. 22, 1952 J. D. REESE 2,583,341
SKIN GRAFT RECEIVING MEMBER
Filed March 21, 1950 2 SHEETS—SHEET 2

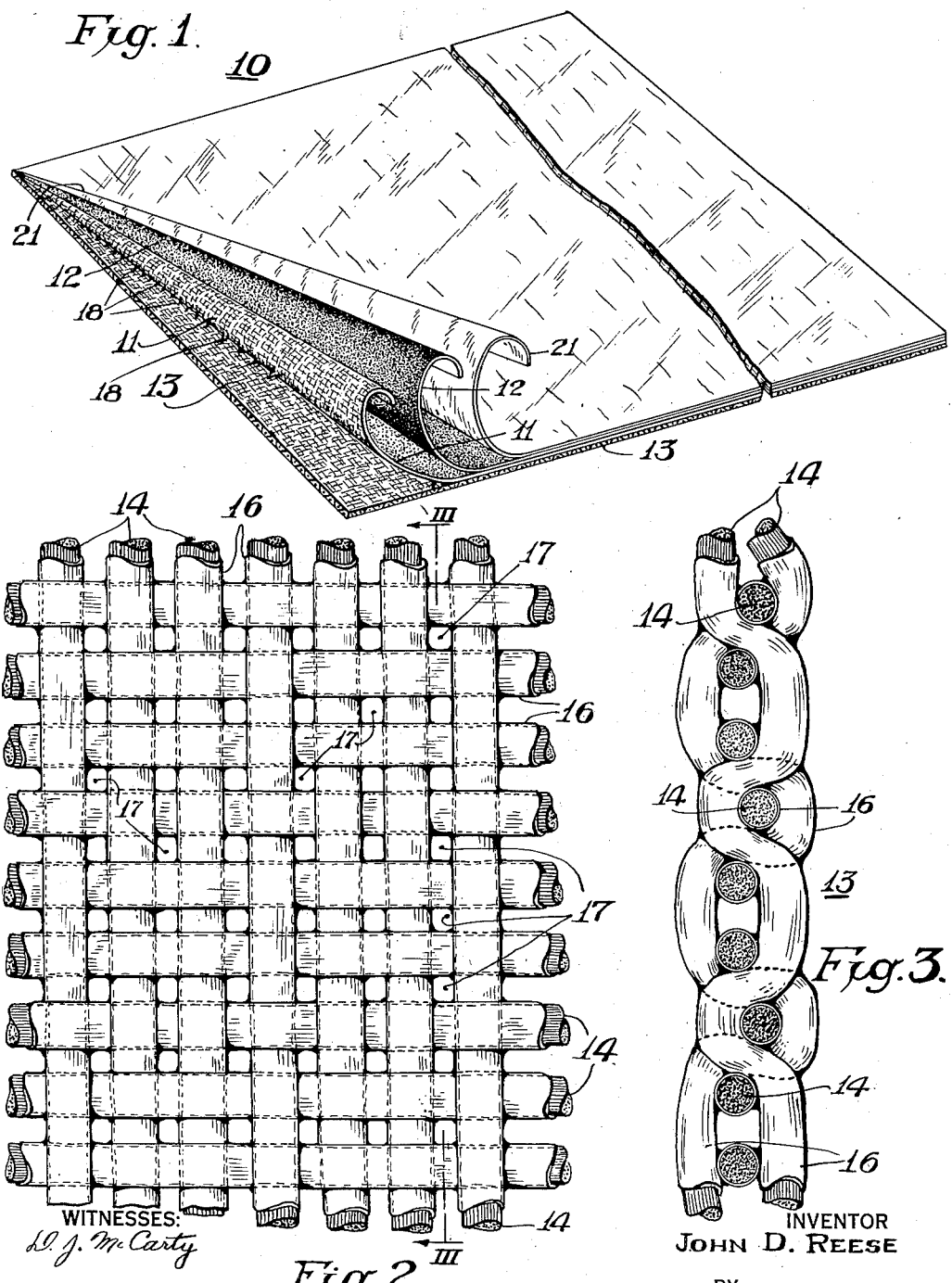

WITNESSES:
D. J. McCarty

INVENTOR
JOHN D. REESE
BY
Ralph T. French
ATTORNEY

Patented Jan. 22, 1952

2,583,341

UNITED STATES PATENT OFFICE 2,583,341

SKIN GRAFT RECEIVING MEMBER

John D. Reese, Philadelphia, Pa.

Application March 21, 1950, Serial No. 150,845

10 Claims. (Cl. 128—305)

This invention relates to surgery, more particularly to skin grafting, and has for an object to provide an improved member for receiving and transferring skin grafts from a donor area to an injured area, without the application to the graft of strain tending to adversely affect its shape or thickness.

While the improvements of the present invention may be used with dermatomes of various types, they are particularly applicable to the type having a convex working face, as illustrated by United States Letters Patent No. 2,442,434 for Dermatome, granted June 1, 1948, to applicant.

In using dermatomes of this latter type, it was the practice originally to apply a coat of adhesive or cement to the convex working face and a similar coat to the skin of the donor area, or to stick to the dermatome working face a rubber sheet of proper size and shape which was coated on both sides with a soft adhesive rubber compound. The convex face, with the adhesive thereon, was then rolled on the adhesive-coated donor area, and simultaneously a cutting blade, supported by the dermatome for reciprocatory and oscillatory movement parallel to the convex face, was given a cutting motion to separate the graft from the donor area as the skin thereof was raised by the adhesive during the rolling action. After completion of the cutting operation the graft was removed from the adhesive, applied to the injured area, and retained in position thereon by sutures or clamps.

Where the convex face of the dermatome was coated with adhesive or cement, the difficulty was frequently encountered that the coating pulled away from the surface in spots, with the result that at such spots the skin of the donor area was not raised and the knife cut holes in the skin graft. The same difficulty arose where the rubber sheet, coated on both sides with rubber adhesive, was relied upon, as the adhesive retaining the rubber sheet on the dermatome convex surface could likewise pull away in spots, resulting in the cutting of holes in the skin graft.

Also, it has been proposed to retain a rubber sheet having adhesive on only its outer skin-engaging face, in position on the working face of a dermatome solely by suction. Here again, difficulty may be encountered in obtaining a satisfactory graft, mainly because of failure of the rubber sheet to remain tight against the dermatome, due to unreliability of the suction apparatus. Whether the rubber sheet is held in position by suction or by adhesive, it may be subject to wrinkling or to partial separation from the dermatome because of non-uniformity of securing action.

In applicant's United States Letters Patent No. 2,442,433, granted June 1, 1948, for Skin Graft Transfer Member, there is disclosed a skin graft transfer member comprising a strip of inextensible fabric coated on one side with a rubber adhesive and on the other side with a layer of vulcanized rubber. The adhesive surface of this graft transfer member is normally covered with a protective layer or sheet, such as Holland cloth or other airtight material, which is adapted to be removed from the member just prior to cutting of the skin graft.

This last-mentioned skin graft transfer member makes possible the cutting of skin grafts unmarred by holes or thin spots, and which can be retained on injured areas of a patient merely by the use of conventional adhesive tape applied to the edges of, or completely across, the graft transfer member. In such cases the skin graft is left on the transfer member and the latter not only maintains the graft in a condition of normal tension, but also serves as a backing by which the graft is retained in position on the injured area by the attachment thereto of adhesive tape, as mentioned above.

It has been found that the graft receiving or transfer member disclosed in the last-mentioned patent has two limitations; first, that the vulcanized rubber backing does not always slide freely on the dermatome working face when being drawn taut thereon, and second, that where the injured area to be grafted presents an irregular surface as, for example, at an ankle or knee, the inextensibility of the fabric in the graft transfer member prevents the deformation of the member which is necessary if it is to engage the injured area over the entire surface of the latter.

In this prior graft receiving or transfer member, the fabric reinforcing strip was permanently secured between the two layers of rubber, with the result that the fabric and the vulcanized rubber were inseparable.

These problems were partially solved by the invention disclosed in the copending application of Reese et al., Serial No. 728,356, filed February 13, 1947 (now abandoned), for Graft Transfer Members, wherein the relative positions of the reinforcing fabric and the vulcanized rubber were reversed to place the latter between the fabric and the adhesive coating, and the nature of the connection between the fabric and the vulcanized rubber also was changed to render the fabric separable from the vulcanized rubber, with the result that while the fabric still served its function of rendering the graft transfer member inextensible during cutting of the graft, it could thereafter be removed from the two layers of rubber and the graft adhering to the rubber, so that the fabricless rubber backing and the graft could be deformed sufficiently to closely engage all parts of an irregular injured surface to be grafted. Also, by placing the fabric at the back of the graft transfer member there was provided a dermatome-engaging surface having a low coefficient of friction as compared with the vulcanized rubber backing of the earlier construction, thereby permitting shifting or slipping of the graft transfer member on the dermatome convex surface as force was applied to one end of the member during the tightening thereof.

While skin graft receiving or transfer members constructed in accordance with the disclosure of the Reese et al. copending application, supra, represent a material advance in the art of skin graft cutting, they are not always entirely satisfactory under all conditions of use. In the manufacture of the members difficulty has been encountered in obtaining uniformity of chemical adhesion between the base sheet of vulcanized rubber and the fabric reinforcing sheet. The fabric sheet and the rubber sheet (unvulcanized) are passed together between heated rolls of a calender where application of heat and pressure vulcanize the rubber in contact with the fabric. Slight variations in either the temperature or the pressure during the calendering may result in serious variations in the degree of adhesion of the two sheets to each other. As result, at one extreme it may be very difficult, if not impossible, to separate the two after cutting of the graft, while at the other extreme the two sheets may partially separate prematurely, resulting in cutting of holes in the graft during its removal from the donor area.

The present invention overcomes the abovementioned difficulties by substituting for the uncertain and variable chemical adhesion between the vulcanized rubber sheet and the fabric sheet, a mechanical connection in the form of a multitude of minute rubber rivets, integral with the vulcanized rubber sheet and extending through and into the interstices of the fabric sheet. To prevent chemical adhesion in addition to the mechanical connection, the strands or threads of the fabric are coated with a substance characterized by its freedom from adhesion to rubber vulcanized in contact therewith. Further advantages and improvements are effected by the use of a glass fabric, as will be explained hereinafter.

Accordingly, another object of the invention is to provide a skin graft receiving member having a mechanical connection between a vulcanized rubber base sheet and an adjoining reinforcing fabric.

Yet another object of the invention is to provide a fabric to which vulcanized rubber does not chemically adhere during vulcanization.

A further object of the invention is to provide, in a graft-receiving member having a base sheet of vulcanized rubber and an adjacent reinforcing fabric, a plurality of vulcanized rubber rivets integral at one end with the vulcanized rubber sheet and extending through interstices of the fabric to mechanically unite the fabric and the rubber sheet.

Another object of the invention is to provide means for preventing chemical adhesion of rubber to glass fabric during vulcanization of the former while in contact with the latter.

These and other objects are effected by the invention as will be apparent from the following description and claims taken in accordance with the accompanying drawings, forming a part of this application, in which:

Fig. 1 is a broken perspective view of a laminated skin graft receiving member constructed in accordance with the present invention, the laminations being shown separated at one corner of the member to clearly illustrate the novel construction and arrangement;

Fig. 2 is a greatly enlarged fragmentary plan view of the reinforcing fabric comprising the bottom lamination of the member as illustrated in Fig. 1;

Fig. 3 is a sectional view, taken along the line III—III of Fig. 2, looking in the direction indicated by the arrows;

Figures 4, 5:
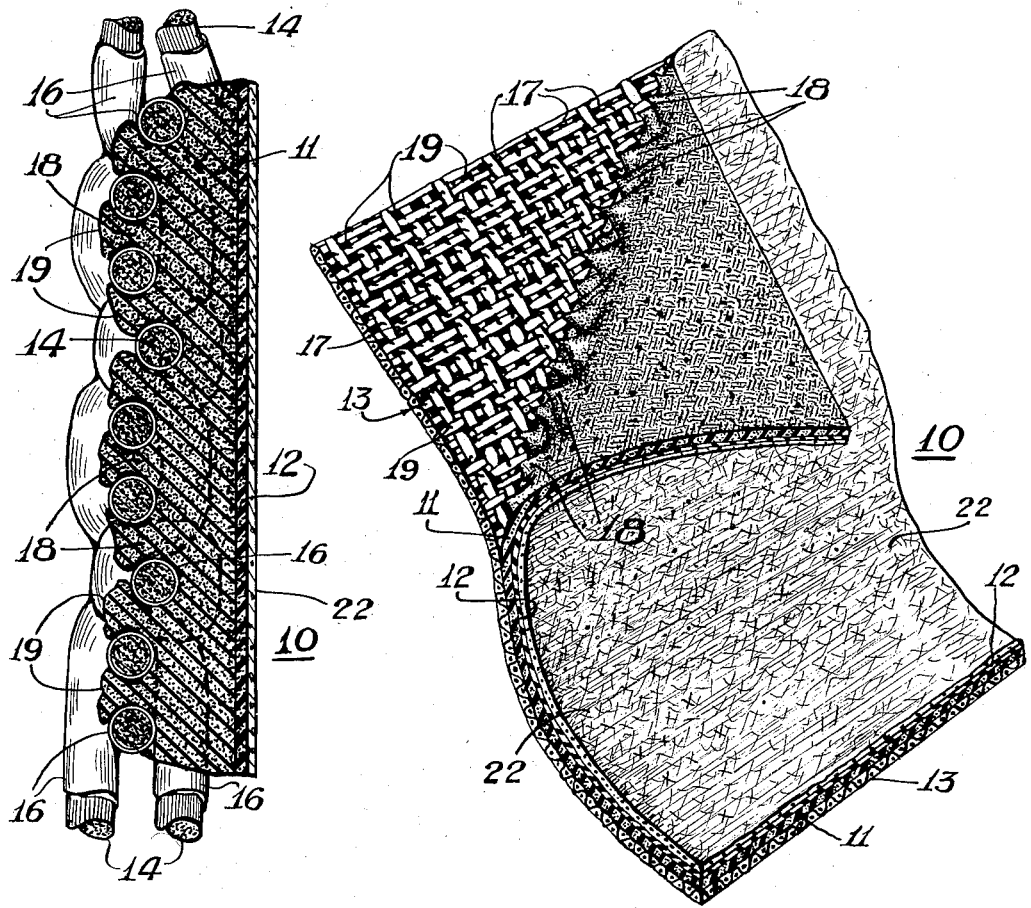
Fig. 4 is a greatly enlarged fragmentary sectional view.
Fig. 5 is an enlarged fragmentary perspective view of a graft-receiving member, with a skin graft thereon, during separation of the fabric reinforcing sheet from the vulcanized rubber base sheet by fracture of the rubber rivets or by their withdrawal from the interstices of the fabric.

Referring now to the drawings in greater detail, the reference character 10 indicates, in its entirety, a laminated skin graft receiving member, comprising a base sheet 11 of vulcanized rubber, a coating 12 of suitable adhesive, preferably raw or unvulcanized rubber, and a sheet 13 of reinforcing fabric.

Special characteristics are required for the fabric reinforcing or backing sheet 13. For example, it should be pliable, substantially inextensible, capable of withstanding a pull of one hundred pounds per inch of width of the strip with an elongation of less than two per cent, capable of sterilization for one hour in germicidal solutions, and capable of repeated sterilizations of this character. Further, the fabric should be incapable of chemical adhesion with the vulcanized rubber sheet 11.

It has been found that glass cloth or fabric may have all of these characteristics except the one last-mentioned. Hence, it is preferred that the fabric 13 be comprised of glass strands or threads 14, which, to take care of the lacking characteristic, are encased in a coating 16 of any substance having the desired characteristic of freedom from chemical adhesion with the vulcanized rubber. The substance of the coating 16 may be that used to coat Holland cloth and Textolin, both well known in the insulated fabric art.

The glass cloth 13 may consist of the individual glass threads or yarns 14 woven in the conventional manner with standard weaving equipment and having warp and filler yarns with standard square or crow-foot satin weave.

A glass cloth particularly satisfactory for the purpose, and illustrated in Figs. 2 and 3, is woven with two threads over and one under in both directions and has a thread count of 64 x 60 yarns per inch and possesses a minimum tensile strength of 250 pounds per inch of width of the sheet. The individual yarns used have the standard designation 450—2/2; the thickness of the woven fabric is approximately seven thousandths of an inch and the weight is 6.70 ounces per square yard. Such fabric is known as ECC-138 continuous filament glass cloth. However, other glass fabrics having similar characteristics could be used with satisfactory results.

The coating 16 may be applied to the glass fabric by the conventional dipping method, whereby each individual yarn or thread 14 is coated. Before the coating 16 dries, the excess is removed from the interstices 17 of the fabric by suitable means, such as a blast of air or by shaking.

When the coated fabric 13 and the rubber base sheet 11 are passed between the heated rolls of a calender together, a portion of the soft rubber is forced into and through the interstices of the fabric and there vulcanized. The portions 18 of the vulcanized rubber in the interstices are structurally the equivalent of rubber rivets provided at their free ends with heads 19, which mechanically retain the fabric secured to the vulcanized rubber base sheet (Figs. 4 and 5).

The adhesive coating 12 may be protected, prior to use, by a sheet 21 of suitable material which is flexible, non-porous to air, will not become brittle for two years, will stand heating to 180 degrees for twenty-four hours during processing, is insoluble in germicidal solutions, and will withstand repeated sterilizations in such solutions. Polyethylene has been found satisfactory as regards the above-mentioned requirements for the protective layer 21.

The mode of utilizing such a graft-receiving or graft-transfer member is by now so well known in the art that detailed description thereof appears unnecessary here. However, this information is presented in applicant's prior United States Letters Patent No. 2,442,434, granted June 1, 1948.

Assuming that a skin graft 22 has been cut from a donor area and retained on the graft-receiving member 10 by the adhesive coating 12, and that the glass fabric 13 is to be removed from the remainder of the graft-receiving member to render said remainder sufficiently deformable to closely engage all portions of an irregular surface of injured area to be grafted. Separation of the fabric 13 is started at one corner of the member 10 and continued manually, in much the manner illustrated in Fig. 5. The rubber rivets 18, which are the sole connection for the fabric, either are fractured, or pull out of the interstices of the fabric.

In Fig. 4 the vulcanized rubber 11 and fabric 13 have been enlarged to a greater degree than the adhesive coating 12 and skin graft 22, to clearly illustrate the rivet interlock between the fabric and the vulcanized rubber.

Throughout the specification and claims the term "rubber" has been used in its broad sense, and includes not only natural rubber, but synthetic rubber and other materials and compounds having the characteristics of rubber.

While the invention has been shown in but one form, it will be apparent that it is not so limited, but is susceptible of various changes and modifications without departing from the spirit thereof.

What is claimed is:

1. A skin graft receiving member comprising a base sheet of flexible elastic material, an adhesive coating on one face of said base sheet, a reinforcing sheet of flexible inextensible material on the other face of the base sheet, and means providing a separable mechanical connection between the reinforcing sheet and the base sheet.

2. A skin graft receiving member comprising a pliable sheet of vulcanized rubber, a coating of adhesive on one face of said rubber sheet, a sheet of fabric on the other face of the rubber sheet, and means mechanically joining said sheets, said last-mentioned means being rupturable, whereby said sheets may be separated.

3. A skin graft receiving member comprising a base sheet of pliable material, an adhesive coating on one face of the base sheet, a perforated sheet of flexible inextensible reinforcing material on the other face of the base sheet, and rupturable rivets temporarily joining said sheets mechanically.

4. A flexible inextensible graft receiving member of laminated construction comprising a layer of adhesive, a sheet of glass fabric, and a sheet of vulcanized rubber separating said adhesive layer and said glass fabric, and means providing a mechanical connection between the glass fabric sheet and the vulcanized rubber sheet.

5. A skin graft receiving member comprising a base sheet of vulcanized rubber, a coating of adhesive permanently united to one face of said base sheet, a perforated sheet of reinforcing material temporarily connected to the other face of the base sheet, and rupturable rivets carried by said base sheet and extending through perforations of the reinforcing material and providing the temporary connection between said base sheet and said reinforcing material.

6. A skin graft receiving member comprising a base sheet of pliable rubber, an adhesive coating on one face of the base sheet, a perforated sheet of flexible inextensible reinforcing material at the other face of the base sheet, rubber rivets projecting from said other face of the base sheet and extending through the perforations of the reinforcing sheet for temporarily uniting said base and reinforcing sheets, and a coating on the reinforcing material serving to separate the latter from the rubber of the base and of the rivets, said coating being characterized by its freedom from adhesion to rubber vulcanized in contact therewith.

7. A skin graft receiving member comprising a base sheet of pliable rubber or the like; an adhesive coating at one face of the base sheet; a sheet of flexible inextensible fabric at the other face of the base sheet; a coating enveloping the strands of the fabric and being characterized by its freedom from adhesion to rubber vulcanized in contact therewith, said coated fabric having interstices between its coated strands; and rubber rivets projecting from said other face of the base sheet and received in the interstices of the fabric, whereby said fabric is mechanically secured to the rubber base sheet.

8. A skin graft receiving member comprising a base sheet of pliable vulcanized rubber; an adhesive coating on one face of said base sheet; a sheet of flexible inextensible glass fabric on the other face of the base sheet; a coating enveloping the strands of the glass fabric, said coated fabric having interstices between the coated strands; and rubber rivets projecting from the other face of the rubber base sheet and extending through the interstices of the coated fabric with said coating separating the rubber rivets from the glass strands, said coating being characterized by its freedom from adhesion to rubber vulcanized in contact therewith, whereby said glass fabric and vulcanized rubber sheets are joined solely by mechanical means comprising the rivets.

9. A skin graft receiving member comprising a base sheet of pliable vulcanized rubber; an adhesive coating on one face of said rubber sheet; a sheet of flexible inextensible fabric on the other face of the rubber sheet, said fabric having interstices between the strands thereof; vulcanized rubber rivets extending perpendicularly from said other face of the rubber sheet and projecting into the interstices of the fabric to secure said fabric and rubber sheet together; and a film of material interposed between the strands of the fabric and the rubber of the sheets and rivets the material of said film being characterized by its freedom from adhesion to rubber vulcanized in contact therewith 10. A flexible inextensible graft receiving member of laminated construction comprising a layer of adhesive, a layer of glass fabric having interstices between its strands, a layer of vulcanized rubber separating said adhesive layer and the fabric layer, a coating enveloping the strands of the glass fabric, and vulcanized rubber rivets integral with and projecting from that side of the rubber layer adjacent the fabric, said rivets extending through the interstices of the coated fabric and being separated from the glass strands thereof by said coating.

JOHN D. REESE.

REFERENCES CITED

The following references are of record in the file of this patent:

UNITED STATES PATENTS

| Number | Name | Date |
| --- | --- | --- |
| 1,650,266 | Dexter | Nov. 22, 1927 |
| 2,442,433 | Reese | June 1, 1948 |